C. A. McINTOSH.
OIL TESTING APPARATUS.
APPLICATION FILED MAR. 25, 1921.

1,430,310.

Patented Sept. 26, 1922.

Inventor
Clarence A. McIntosh

By: Frease, Merkel, Saywell and Bond
Attorneys

Patented Sept. 26, 1922.

1,430,310

UNITED STATES PATENT OFFICE.

CLARENCE A. McINTOSH, OF CANTON, OHIO.

OIL-TESTING APPARATUS.

Application filed March 25, 1921. Serial No. 455,693.

*To all whom it may concern:*

Be it known that I, CLARENCE A. MCINTOSH, a citizen of the United States, residing at Canton, in the county of Stark and State of Ohio, have invented a new and useful Oil-Testing Apparatus, of which the following is a specification.

The invention relates to an oil testing apparatus and more particularly to a device designed to permit the driver of an automobile to ascertain, from the driver's seat, the level of the oil in the crank case of the engine.

The objects of the invention are to provide a device for testing the oil level in an automobile engine crank case and consists in the provision of valves located in the rear end portion of the crank case and arranged to be operated by pull cords extending to a point adjacent to the driver's seat, a window being provided in the floor or dash board of the automobile at a point permitting the driver to observe the valves as he operates the same by the pull cords.

With these objects in view, the invention consists in the construction and arrangement of parts hereinafter described and illustrated in the accompanying drawing, it being understood that changes in the proportion and details of construction may be made without departing from the appended claim.

The invention thus set forth in general terms is illustrated in the accompanying drawing, forming part hereof, in which—

Figure 1:
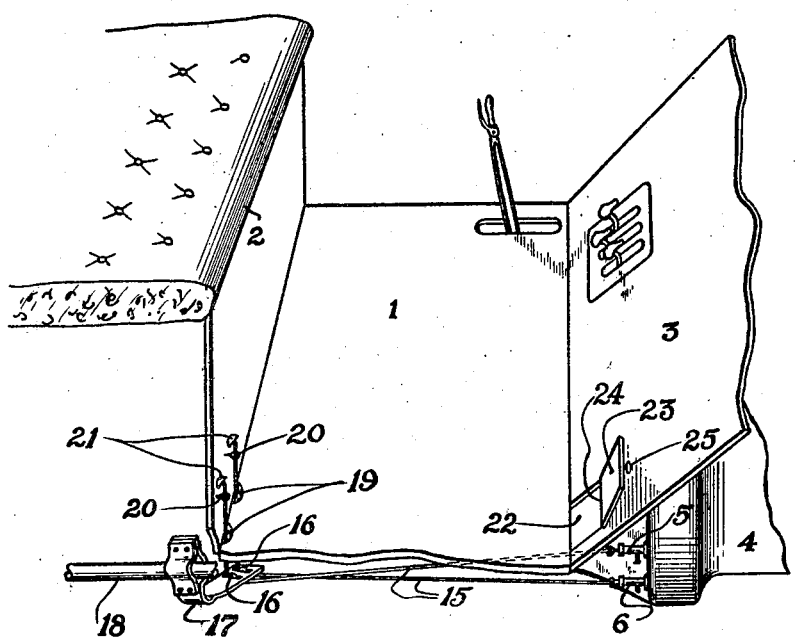
Figure 2:
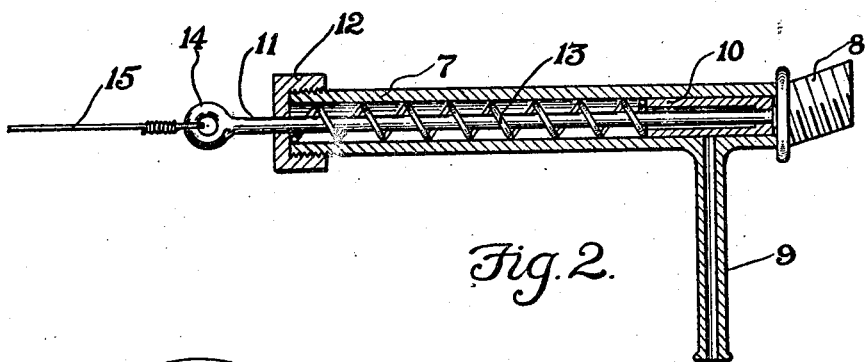
Figure 3:
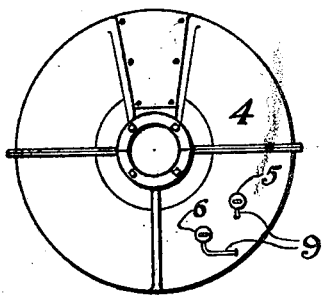

Figure 1 is a perspective view of a portion of the interior of an automobile car body and engine showing the invention applied thereto;

Fig. 2, a longitudinal sectional view, on a larger scale of one of the valves; and Fig. 3, an end view of a portion of the crank case of the engine showing the valves thereon.

Similar numerals of reference indicate corresponding parts throughout the several views.

The floor board of an automobile is indicated at 1, the driver's seat at 2, the dash board at 3, a rear portion of the crank case of the engine being indicated at 4. These parts are all of the usual construction and in themselves form no part of the present invention.

As is well known, it is usual to provide a pair of petcocks upon the rear end portion of the crank case of an automobile engine for the purpose of determining the oil level in the crank case. As these petcocks are in a practically inaccessible position upon the automobile, considerable inconvenience is experienced in operating and observing the same and the present invention is designed to provide means for determining the position of the oil level without the necessity of the driver crawling beneath the automobile to observe the petcocks.

In the present construction, the valves indicated generally by the numerals 5 and 6, are substituted for the two petcocks, the valve 5 being located above, and preferably slightly to one side of the valve 6. Each of these valves comprises a cylindrical casing 7 having an angular threaded extremity 8 for attachment to the crank case.

A nipple 9 depends from the forward end of each valve casing, the nipple upon the valve 6 being preferably extended below the valve 5 in order that each of these nipples will be located in position to be easily and readily observed from the driver's seat.

The cylindrical valve 10 is slidably mounted within the casing 7 and connected to the stem 11, said stem being slidably extending through the cap 12, threaded upon the outer end of the casing, a spring 13 being interposed between said cap and the valve for the purpose of normally holding the valve in the position shown in Fig. 2, closing the nipple 9.

An eye or the like indicated at 14 may be provided upon the extremity of each stem, a cord or other flexible member 15 being connected thereto and passed over a pulley 16 mounted in the bracket 17, which may be attached to the exhaust pipe 18, said cord being extended upwardly through an aperture 19 in the floor board and through a keeper 20 upon the front of the driver's seat, a button 21 or the like being provided upon the extremity of the cord and located in a position to be grasped by the driver to pull the cord in order to open the valve.

In order that the operation of the valves may be discernible to the driver, a window 22 is provided in the dash board at a point in a suitable location to permit the valves to be observed therethrough, by the driver. For the purpose of preventing the heated air and fumes from the engine entering the interior of the car through said window, a cover plate or door 23 may be hinged as shown at 24, adjacent to the window and arranged to normally cover said window, a finger button 25 being provided for opening said door.

It will be understood that use is made of the valves 5 and 6 in determining the position of the oil level in the crank case 4. When oil is supplied to said crank case, the valve 6 is closed and the valve 5 left open and oil allowed to enter the crank case until it drips from the nipple of the valve 5.

The oil level should be maintained normally above the valve 6 which is used from time to time to test said level, and when oil fails to drip therefrom on opening the same, indicating that the level of the oil has dropped below that point, the driver then knows that the oil supply in the crank case should soon be replenished.

Without some means such as the present improvement provides, for opening and closing these valves, this operation is awkward and inconvenient because of the practically inaccessible location of the valves.

The present device obviates this difficulty, and the operation and observation of the valves is rendered very simple and easy.

The device may be easily and readily applied to an automobile at a small expense. It will be evident from the above, that the device is in itself simple in operation and a great convenience to drivers of automobiles, allowing them to easily and quickly inspect the condition of the oil level in the crank case of the engine at any time without even the necessity of stopping the automobile.

I claim:—

In an automobile, an oil testing apparatus comprising a pair of valves connected to the rear end portion of the crank case of the automobile engine, one of said valves being located beneath and to one side of the other valve, and having a nipple extending to a point beneath the other valve, means for normally closing the valves, flexible members connected to the valves and extending to a point beneath the driver's seat, a window in the dashboard of the automobile located in a position to permit observation of the valves from the driver's seat, and a cover normally closing said window.

In testimony that I claim the above, I have hereunto subscribed my name.

CLARENCE A. McINTOSH.